W. H. PERRY.
SANITARY BAKING PAN.
APPLICATION FILED OCT. 12, 1907.

901,999.

Patented Oct. 27, 1908.

WITNESSES
Justin A. Palland
William Lyman

INVENTOR
Wilton H. Perry
BY
Andrew Ford
ATTORNEYS

UNITED STATES PATENT OFFICE.

WILTON H. PERRY, OF NEW YORK, N. Y.

SANITARY BAKING-PAN.

No. 901,999.

Specification of Letters Patent.

Patented Oct. 27, 1908.

Application filed October 12, 1907. Serial No. 397,184.

*To all whom it may concern:*

Be it known that I, WILTON H. PERRY, a citizen of the United States, and resident of the borough of Brooklyn, city of New York, in the county of Kings and State of New York, have invented certain new and useful Sanitary Baking-Pans, of which the following is a specification.

Figure 1:
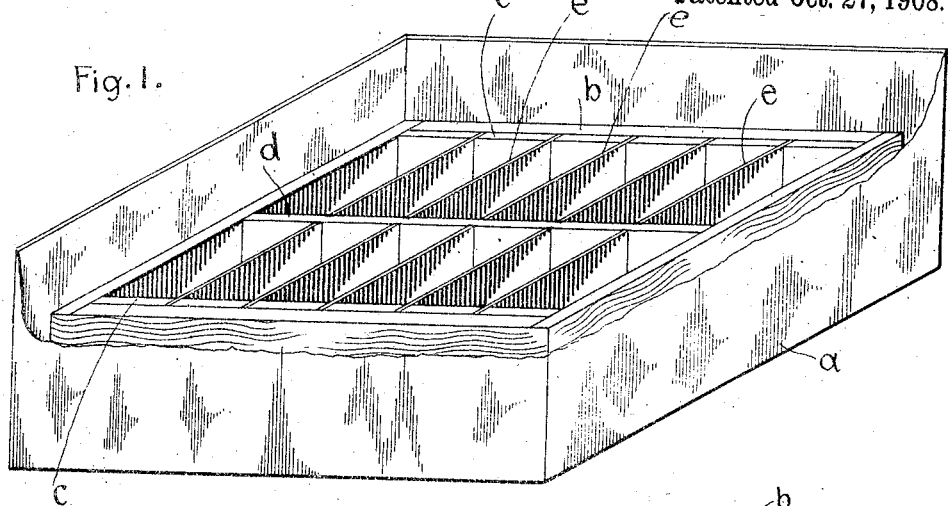
Figure 2:
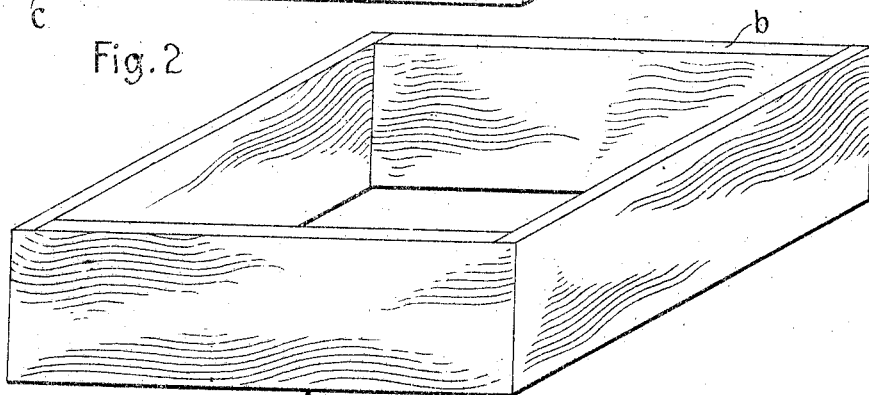
Figure 3:
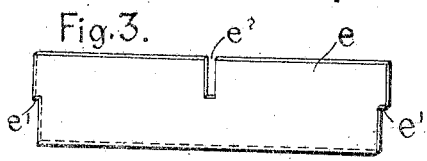
Figure 4:
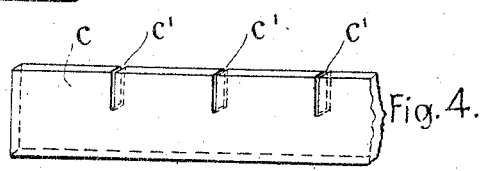
Figure 5:
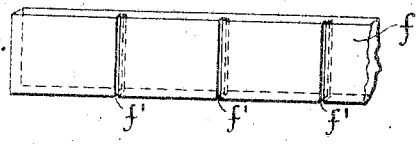
Figure 6:
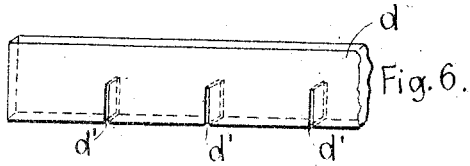
Figure 7:
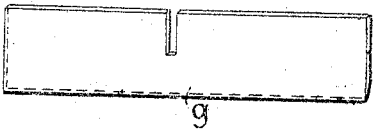
Figure 8:
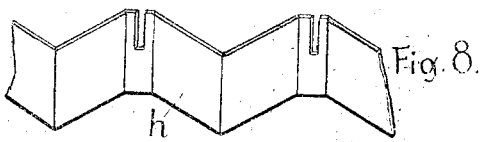

My invention relates to improvements in baking pans, and the object of my invention is to provide a simple and sanitary pan for holding bread, cake and similar substances while being baked and which may be easily and thoroughly cleaned. I accomplish this object by the device illustrated in the accompanying drawings, in which Figure 1 is a view of my device complete, parts of the casing being broken away. Fig. 2 is a view of the frame. Fig. 3 is a view of one of the lateral division plates. Fig. 4 is a view of one of the longitudinal plates. Fig. 5 is a view of one of the side plates. Figs. 6, 7 and 8 are optional forms of the division plates.

Similar letters refer to similar parts throughout the several views.

In a sheet metal casing or pan $a$, I provide a frame $b$ of the same shape as the pan $a$, but preferably not so deep as the pan casing. Side strips or plates $c\ c$ are placed within, and at each of the ends of the frame $b$. These strips $c$ are provided with cut out seats $c'\ c'\ c'$ at suitable intervals. A dividing plate or strip $d$ is then placed in the pan parallel with the side strips $c\ c$. The dividing plate $d$ is provided with cut out seats $d'\ d'\ d'$ to fit over the seat $e^2$ in the strip $e$. Dividing plates $e$, provided with end lugs $e'\ e'$ to fit into the seats $c'\ c'$ in the side plates $c\ c$ and with cut out seats $e^2$ to fit the dividing plates $d$, at the seats $d'$ are then placed in position in the frame. There is thus provided a pan divided by strips into suitable sections for the baking of bread or cake, which strips when removed from the pan and frame $b$, will fall apart releasing the completed and baked article. The parts may be easily cleaned as there are no corners or crevices, and all of the parts may be readily reached for cleansing.

Side plates $f$ in the form shown in Fig. 5, in which I provide cut out sockets $f'\ f'\ f'$ for the reception of the ends of the lateral strips, may be substituted for the side plates $c\ c$. When this form is used, I provide strips $g$ in place of the strips $e$. These strips $g$ are preferably formed of sheet metal, and may when desired be bent or folded into fanciful or other shapes, as shown in Fig. 8.

I prefer to use a casing $a$ deeper than the frame $b$ and its dividing strips, so that a cover may be used when desired, thus forming an air chamber above the article to be baked.

The device may be made of any material, but I prefer to make the frame $b$ of wood with a sheathing of zinc or other metal. The frame $b$ will serve to keep the bread or cake away from the sides and corners of the casing $a$ and keep it clean even though the casing $a$ has not been thoroughly cleansed.

Having thus described my invention, what I claim is,

In a bake pan, an outer casing formed of a bottom, sides and ends, a frame in the outer casing having sides and ends and having the lower edges of said sides and ends seating on said bottom of the outer casing, said bottom of the outer casing forming a bottom for the frame, said sides and ends of the outer casing projecting for a distance up from the top edges of the frame, side plates having vertical sockets, arranged to engage the inner face of each of said sides of the inner casing, lateral strips formed of bendable sheet metal having their ends removably received in said sockets of said plates, and provided with cut out seats, and a dividing plate engaged in said cut-out seats and having opposite cut-out seats to receive said lateral strips.

Signed at borough of Brooklyn, city of New York, in the county of Kings and State of New York this fourth day of October A. D. 1907.

WILTON H. PERRY.

Witnesses:
JUSTIN S. GALLAND,
ADOLPH DISSIN.